United States Patent [19]

Wason

[11] Patent Number: 4,584,330

[45] Date of Patent: Apr. 22, 1986

[54] SYNTHETIC ALKALI METAL ALUMINUM SILICATES AS PIGMENT/COLORANT EXTENDERS AND PROPERTY ENHANCERS IN PLASTICS

[75] Inventor: Satish K. Wason, Churchville, Md.

[73] Assignee: J. M. Huber Corporation, Locust, N.J.

[21] Appl. No.: 769,770

[22] Filed: Aug. 27, 1985

Related U.S. Application Data

[63] Continuation of Ser. No. 576,831, Feb. 3, 1984, abandoned.

[51] Int. Cl.$^4$ ............................................. C08K 3/34
[52] U.S. Cl. .................................. 523/513; 523/521; 524/450
[58] Field of Search ................. 523/513, 521; 524/450

[56]  References Cited
U.S. PATENT DOCUMENTS

| | | | |
|---|---|---|---|
| 2,848,346 | 8/1958 | Bertorelli | 106/288 B |
| 3,208,984 | 9/1965 | Dekking | 524/450 |
| 3,258,439 | 6/1966 | Braun | 524/450 |
| 3,402,151 | 9/1968 | Kutch | 528/373 |
| 3,419,533 | 12/1968 | Dieterich | 528/44 |
| 3,424,602 | 1/1969 | Nauroth et al. | 106/288 B |
| 3,509,082 | 4/1970 | Mays | 106/288 B |
| 3,533,987 | 10/1970 | Giambra et al. | 523/211 |
| 3,607,822 | 9/1971 | Nishino | 524/847 |
| 3,909,286 | 9/1975 | Fitton | 106/288 B |
| 4,008,294 | 2/1977 | Marans et al. | 525/168 |
| 4,036,663 | 7/1977 | Williams et al. | 106/288 B |
| 4,081,496 | 3/1978 | Finlayson | 523/508 |
| 4,101,604 | 7/1978 | Rowe | 523/521 |
| 4,220,567 | 9/1980 | Kindervater et al. | 523/450 |
| 4,249,903 | 2/1981 | Smolka et al. | 8/137 |
| 4,250,081 | 2/1981 | Bode et al. | 524/450 |
| 4,293,458 | 10/1981 | Gruenberger et al. | 524/450 |
| 4,338,226 | 7/1982 | Worschech et al. | 524/450 |
| 4,371,656 | 2/1983 | Kashiwase et al. | 524/450 |
| 4,397,010 | 12/1981 | Sandler et al. | 524/450 |
| 4,416,805 | 11/1983 | Kostinko | 106/288 B |
| 4,425,448 | 1/1984 | Concannon et al. | 524/450 |
| 4,497,918 | 2/1985 | Wason | 523/521 |

OTHER PUBLICATIONS

S. K. Wason, "Unique Synthetic Sodium Aluminum Silicates (SSAS) as Pigment/Color Extenders and Property Enhancers in Plastics", 38th Soc. of Plastics Symposium, Feb. 7–11, 1983.

Primary Examiner—Lewis T. Jacobs
Attorney, Agent, or Firm—Harold H. Flanders; Robert L. Price

[57]  ABSTRACT

Plastic compositions having enhanced tensile, reinforcing, viscosity, opacity, brightness or pigment-extending properties comprise a plastic material having dispersed therein a synthetic sodium aluminum silicate with an average particle size of about 3.0 to 8.0 microns.

8 Claims, 8 Drawing Figures

FIG. 1.

GEL COAT VISCOSITY vs. EXTENDER STRUCTURE

GEL COAT FORMULATION

| | CONTROL | EXTENDER |
|---|---|---|
| %TiO$_2$ | 10 | 9 |
| %EXTENDER | 0 | 1 |

▨ CONTROL
☰ EXTENDER

FIG. 2.

GEL COAT OPACITY vs. EXTENDER STRUCTURE

▨ CONTROL
☰ EXTENDER

FIG. 3.

GEL COAT VISCOSITY AS A FUNCTION OF TIME

PVC VISCOSITY vs. EXTENDER STRUCTURE

FIG. 6.

PVC TENSILE STRENGTH vs. EXTENDER STRUCTURE

FIG. 7

TENSILE STRENGTH
vs.
CM TREATMENT
ON VLS EXTENDER

■ CONTROL
☰ TREATED EXTENDER

FIG. 8

EFFECT OF
VLS EXTENDER
ON LDPE
BRIGHTNESS

■ CONTROL
☰ VLS (35) EXTENDER

FORMULATION

| | CONTROL | EXTENDER | | | |
|---|---|---|---|---|---|
| PHR TiO₂ | 3 | 2.85 | 2.70 | 2.40 | 0 |
| PHR EXTENDER | 0 | 0.15 | 0.30 | 0.60 | 3 |
| % EXTENDER | 0 | 5.0 | 10.0 | 20.0 | 100 |

SYNTHETIC ALKALI METAL ALUMINUM SILICATES AS PIGMENT/COLORANT EXTENDERS AND PROPERTY ENHANCERS IN PLASTICS

This application is a continuation of application Ser. No. 576,831, filed Feb. 3, 1984, now abandoned.

BACKGROUND OF THE INVENTION

1. Field of the Invention

This invention relates to synthetic alkali metal aluminum silicates, and more particularly to sodium aluminum silicate materials useful as fillers and extenders in plastic materials.

2. Related Art

Inorganic fillers and extenders are widely used in the plastics industry to reduce costs and to improve properties of filled plastic compounds. Fillers and extenders can be broadly classified into two major categories—the natural, mined materials and the synthetic products.

Natural fillers/extenders are mined and after further processing and modification are used in the plastics industry. Typical fillers/extenders such as clays, limestone, mica, natural silica, quartz, talc, etc. are included in the category of natural, mined products.

Synthetic fillers and extenders are prepared by chemical reactions conducted under controlled conditions to produce products of desired particle size and end use properties. Typical examples of synthetic fillers/extenders are alumina trihydrate, precipitated calcium carbonate, synthetic calcium silicate, synthetic magnesium silicate, synthetic silica, etc. Synthetic fillers/extenders are generally more expensive than their natural counterparts.

Synthetic alkali metal aluminum silicate materials have also been prepared. For example, U.S. Pat. No. 4,249,903 discloses a process for the preparation of cation-exchanging aluminum-silicate granules useful in the removal of cations which cause hard water during washing of textiles or dishes. Granules having a particle size of about 0.05 to 1 mm are prepared by mixing a finely divided, crystalline water-containing alkali metal aluminum silicate powder with a specified number of moles of $SiO_2$ in an aqueous alkali metal silicate solution and a specified number of moles of $Al_2O_3$ as an acidic hydrolyzing aluminum salt, and mixing until the moisture is uniformly absorbed and a granulate with the specified particle size is formed. The granulate is then dried at a temperature of about 80° to 150° C.

The prior art is also aware that materials have been incorporated into unsaturated polyester compositions. For example, in U.S. Pat. No. 4,081,496, organophilic clay gellant compositions have been incorporated into polyester resins to provide a thixotropic product. In addition, in U.S. Pat. No. 4,008,294, ultra fine polypropylene fibers in epoxy resin compositions have been used to cause the resin compositions to have thixotropic characteristics.

Zeolite molecular sieves were incorporated into polysulfide compositions to increase storage stability of the compositions, as taught by U.S. Pat. No. 3,402,151. Similarly, in U.S. Pat. No. 3,419,533 it is disclosed that fillers and plasticizers such as carbon black, precipitated silicic acid, silicic acid sols, clay, and the like may be incorporated into polyurethane plastics as fillers and plasticizers. Additionally, U.S. Pat. No. 3,607,822 incorporates colloidal silica into polyurethane compositions.

Synthetic sodium aluminum silicate (SSAS) products have previously been used as fillers and extenders in paper, paint and natural and synthetic rubber applications; as carriers and free flowing agents in foods, liquids and chemicals; and as raw material intermediates in many specialty applications. The use of SSAS products as pigment/colorant extenders and as reinforcing fillers in plastics has not been known in the art.

SUMMARY OF THE INVENTION

It is accordingly one object of the present invention to provide novel plastic compositions which contain alkali metal aluminum silicates as fillers and extenders.

A further object of the present invention is to provide mixtures of thermoset and thermoplastic resins with alkali metal aluminum silicates as fillers or extenders of pigments.

Other objects and advantages of the present invention will become apparent as the description thereof proceeds.

The present invention meets these objects and advantages in a composition aspect by provision of a plastic composition which comprises a plastic material having dispersed therein a synthetic alkali metal aluminum silicate, and more particularly, sodium aluminum silicate. The silicate is present in the plastic material in an amount which is effective to enhance the tensile strength, viscosity, opacity, brightness, and/or pigment-extending properties of plastic materials formed from thermoset or thermoplastic resins. Preferably, the resin from which the plastic material is formed is a compound selected from the group consisting of unsaturated polyester gel coats, pigmented polyester sheet molding compounds, polyvinyl chloride, polyethylene, epoxy and ethylenevinyl acetate resin.

The synthetic alkali metal aluminum silicates used in the compositions of the present invention preferably comprise about 0.2 up to 40 wt % of the total plastic composition depending on the particular plastic being extended or filled. More preferably, about 0.5 to 10.0 wt %, and most preferably about 0.5 to 5.0 wt % of the alkali metal aluminum silicate is contained in the plastic composition.

In a method of use aspect, the present invention relates to a method for enhancing the properties of plastic compositions. This method comprises the dispersion in a plastic material of a synthetic alkali metal aluminum silicate. The silicate has an average particle size of about 3.0 to 8.0 microns, and is present in an amount effective to enhance the tensile strength, viscosity, opacity, brightness and/or pigment-extending properties of the plastic material.

BRIEF DESCRIPTION OF THE DRAWINGS

Reference is now made to the drawings accompanying the application wherein.

DETAILED DESCRIPTION OF THE INVENTION

The present invention is directed to synthetic, alkali metal aluminum silicate materials, and more particularly to synthetic sodium aluminum silicate (SSAS). As the name implies, the SSAS products are synthetic materials and should not be confused with typical natural products carrying generic names such as aluminum silicates (clays), magnesium silicates (talcs) and numerous other related products. The invention is generally applicable to the use of alkali metal aluminum silicates wherein the alkali metal moiety is sodium, potassium, or lithium. However, the sodium aluminum silicates (SSAS) materials are highly preferred and the invention will be described with respect to these SSAS products.

In brief, the unique SSAS products of this invention are synthesized by the aqueous reaction of aluminum sulfate with a sodium silicate under controlled conditions. The end use properties of the SSAS products can be varied during synthesis by controlling structure and particle size. Unexpected functional properties of SSAS products result from their use as pigment/colorant extenders and property enhancers in selected plastic materials and systems in accordance with this invention. The SSAS materials, when incorporated into plastic materials as fillers and/or extenders provide plastic properties which have improved tensile strength, brightness, opacity, and reinforcing properties at lower cost. Where the alkali metal is sodium, the SSAS products are prepared by the following reaction of aluminum sulfate with sodium silicate:

$$4[Na_2O.XSiO_2] + Al_2(SO_4)_3 \xrightarrow{H_2O}$$

$$Na_2O.Al_2O_3.4[XSiO_2].4-6H_2O + 3Na_2SO_4$$
(SSAS Product)

where X is the number of moles $SiO_2$ contained in the sodium silicate. The sodium aluminum silicates used in the products and methods of the invention are known materials. A number of grades of SSAS materials are sold by the J. M. Huber Corporation under the trademark Zeolex®. Products of this type are available as Zeolex 7A®, Zeolex 80®, and Zeolex 35®. These products are prepared in accordance with the above reaction as described for example in U.S. Pat. No. 2,739,073 of Bertorelli, the disclosure of which is incorporated herein by reference. The insoluble, white precipitate of the SSAS product is filtered, washed, dried and milled to the desired degree of fineness.

Since the sodium aluminum silicates are synthetic products, it is possible to design these products with the desired functional properties such as structure and reinforcing properties. These properties of the SSAS products appear to be related—a higher structure product exhibits higher reinforcing characteristics and a lower structure material resulting in lower reinforcing properties.

The plastic materials which are filled and/or extended by the SSAS materials are selected from the group consisting of thermoset and thermoplastic resins. Particularly preferred plastics are unsaturated polyesters including unsaturated polyester gel coats and pigmented polyester sheet molding compounds (SMC), epoxy coatings, low density polyethylene (LDPE), polyvinyl chloride (PVC) and ethylene vinyl acetate (EVA). Ethylene vinyl acetate is a copolymer of ethylene and vinyl acetate and is a polymeric elastomer.

The SSAS materials are incorporated into plastic compositions of this type by incorporating the SSAS material into the master batch from which the polymer is produced. Other conventional additives may also be present. The SSAS material is incorporated into the plastic composition in the amounts indicated above.

Before discussing the evaluation of SSAS products in plastics, it is necessary to define the concept of "structure" as it relates to the SSAS products. In analogy to the structure definition (see for example U.S. Pat. No. 3,893,840), reported for precipitated silicas, it is possible to synthesize SSAS products with varying structure levels. Since no universally accepted industrial method for particle size determination of synthetic fillers exists and since it is common practice of filler suppliers to run the rubout oil absorption test (*Determination of Oil Absorption*, ASTM, D. 281) on their products, the definition of structure (S. K. Wason "Cosmetic Properties and Structure of Fine Particle Synthetic Precipitated Silica," J. Soc. Cosmet. Chem. 29, 497–521, August, 1978 was arbitrarily based on the oil absorption values rather than the filler particle size. Conforming to the same definition as in silica structure, the SSAS products are called VHS (very high structure) type when the oil absorption values are above 200 cc/100 g and VLS (very low structure) type when the oil absorption values are below 75 cc/100 g. In the following table, LS=low structure, VLS=very low structure, MS=medium structure, HS=high structure, and VHS=very high structure. Intermediate structure categories and corresponding oil absorptions are given. The SSAS products listed in Table II are Zeolex® SSAS materials produced and sold commercially by J. M. Huber Corporation. In the following Table I, the oil absorption is correlated with the structure of the SSAS products.

TABLE I

Definition: SSAS Structure versus Oil Absorption

| SSAS Structure Level | Oil Absorption (cc/100 g) |
|---|---|
| VHS | Above 200 |
| HS | 175–200 |
| MS | 125–175 |
| LS | 75–125 |
| VLS | Less than 75 |

Table II shows comparative properties of specific Zeolex® SSAS products used in this invention.

TABLE II

Typical Properties of SSAS Products*

| Structure | Zeolex® Grade | Oil Absorption (cc/100 g) | Surface Area (m²/g) | Average Particle Size (micrometers) |
|---|---|---|---|---|
| MS | 7A | 145 | 200 | 3.8 |
| LS | 40 | 110 | 65 | 4.4 |
| LS | 80 | 110 | 95 | 4.4 |
| VLS | 35 | 75 | 20 | 6.3 |

TABLE II-continued

Typical Properties of SSAS Products*

| Structure | Zeolex ® Grade | Oil Absorption (cc/100 g) | Surface Area (m²/g) | Average Particle Size (micrometers) |
|---|---|---|---|---|
| VLS | XP 12** | 65 | 40 | 7.1 |

*The oil absorption values were determined by the rubout method, the surface area by the BET method (S. Brunaur, H. Emmett, and E. Tellar, "Adsorption of Gases in Multimolecular Layer," J. Amer. Chem. Soc. 60, 309 (1938)) and the average particle size by the Coulter Counter method (Coulter Electronics, Inc., 590 West Twentieth Street, Hialeah, FL 33010).
**Experimental Zeolex ® product The following examples represent preferred specific embodiments of plastic materials having incorporated therein various SSAS products. Additional data corresponding to these examples may be found in my publication "Unique Synthetic Sodium Aluminum Silicates (SSAS) As Pigment/Colorant Extenders and Property Enhancers in Plastics" reprinted from the 38th Annual Conference, Society of the Plastics Industry, Inc. as presented Feb. 7-11, 1983 (which disclosure is herein incorporated by reference in its entirety).

When the SSAS products of the invention are incorporated into plastics in accordance with procedures described herein improved properties of the plastic product are obtained. Thus, tensile strength, opacity, and brightness are usually increased and rheology characteristics are improved. Further, color values are improved. A particular advantage of the SSAS materials when used as an extender is that a portion of an expensive prime pigment such as $TiO_2$ can be replaced to provide a plastic having better properties at reduced cost since the SSAS material is less expensive than the $TiO_2$.

The following examples set forth illustrations of a series of diverse plastics which are extended and/or filled by the SSAS products. Data is set forth to show the characteristics of the unfilled or unextended plastic (control) and compared with the filled or extended plastic. In the following examples, parts are by weight unless otherwise indicated. Further, the term phr means parts of extender per hundred parts of resin. In the Examples, the extenders are referred to as MS(7A), LS(80), VLS(35) and VLS(12). These refer to the structure of the Zeolex ® material used and the numbers in parentheses are grades of Zeolex ®.

EXAMPLE 1

Gel Coat Evaluation

The gel coat evaluation of the SSAS products was conducted by utilizing procedures described in an earlier study (S. K. Wason and J. W. Maisel, "Thixotropic Properties of New Precipitated Silica in Gel Coats," 36th Annual Technical Conf., 1981, RP/C Institute, SPI, Inc., Section 13-A, pp. 1-9). Commercial unsaturated polyester resins were obtained from well known suppliers and were diluted with styrene monomer to prepare resin masterbatches containing 52% solids. The various components such as promoters, fillers, thixotropes and titanium dioxide grinds were added to the resin masterbatches to prepare gel coats. To evaluate extender properties of the SSAS products, gel coats were prepared in which 5% and 10% by weight of titanium dioxide in the formulation were replaced with the SSAS products. Control gel coats were also prepared in which no SSAS extender was used to replace titanium dioxide.

In the preparation of the gel coats, cobalt octoate (6%) was used as a promoter; Pfizer's microtalc MP-1250 as a filler; J. M. Huber Corporation's precipitated silica, Zeothix 265 ®, as a thixotrope, and E. I. DuPont's R-900 as a titanium dioxide pigment.

The following basic gel coat formulation was utilized:

TABLE III

GEL COAT FORMULATION

| Component | Amount |
|---|---|
| Resin/Styrene Masterbatch (52/48) | 65.1 Parts |
| Cobalt Octoate (6%) | 0.3 Parts |
| Zeothix 265 ® Silica Thixotrope | 4.0 Parts |
| Glycerine | 0.2 Parts |
| Talc Filler | 10.4 Parts |
| TiO₂/Resin Masterbatch (50/50) Grind | 20.00 Parts |
| TOTAL | 100.0 Parts |

Gel coat properties of the various SSAS products were evaluated as a function of the extender structure. Zeothix 265 ®, precipitated silica thixotrope, was used at 4% level in all gel coat formulations. The gel coat properties of the extenders were evaluated by replacing 10% by weight of the $TiO_2$ in the formulation with the appropriate SSAS products. Rheology data was measured on a Brookfield Viscometer at 5 and 50 RPM (spindle No. 5). One week viscosity data of the control (with no extender) and the extender containing gel coats was also determined, as were thixotropic index values.

Figure 1:
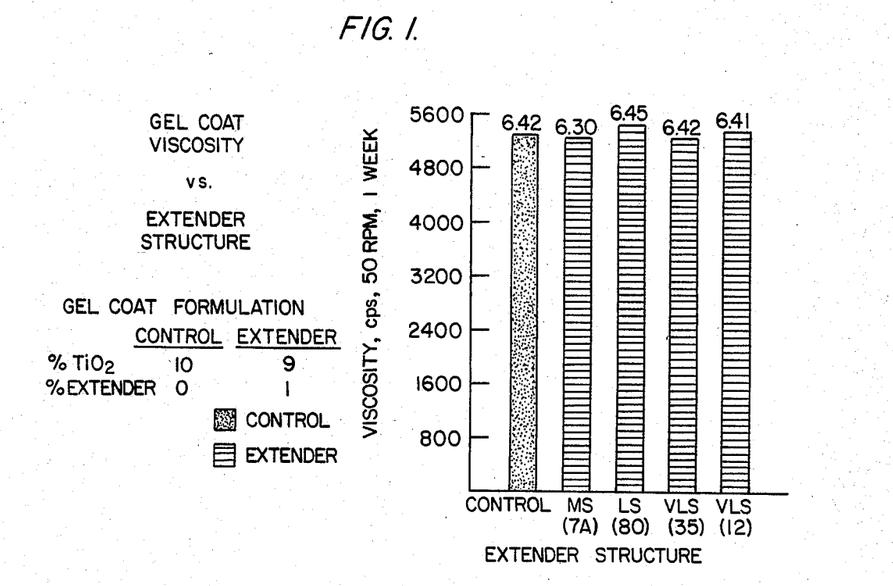
FIG. 1 is a bar graph illustrating the improvements in the thixotropic index of gel coat compositions.
Figure 2:
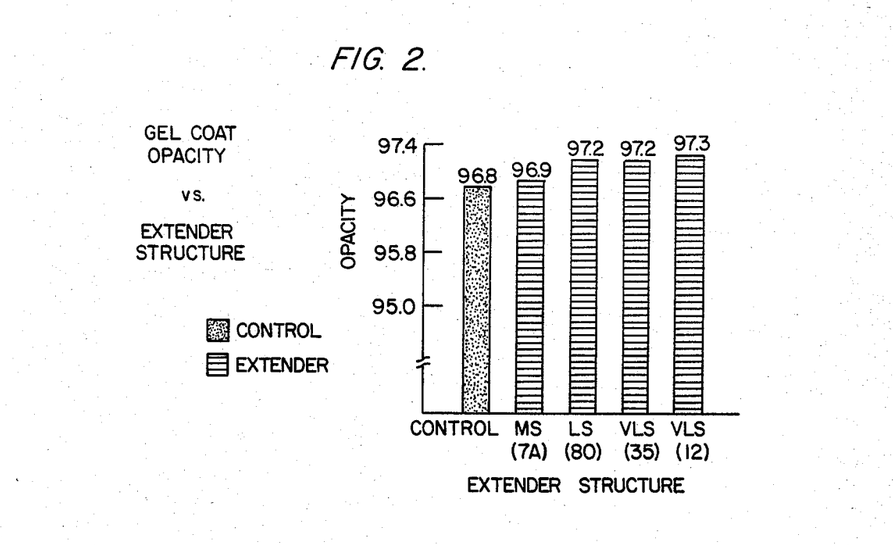
FIG. 2 is a bar graph illustrating the improvements in opacity of gel coat compositions.
Figure 3:
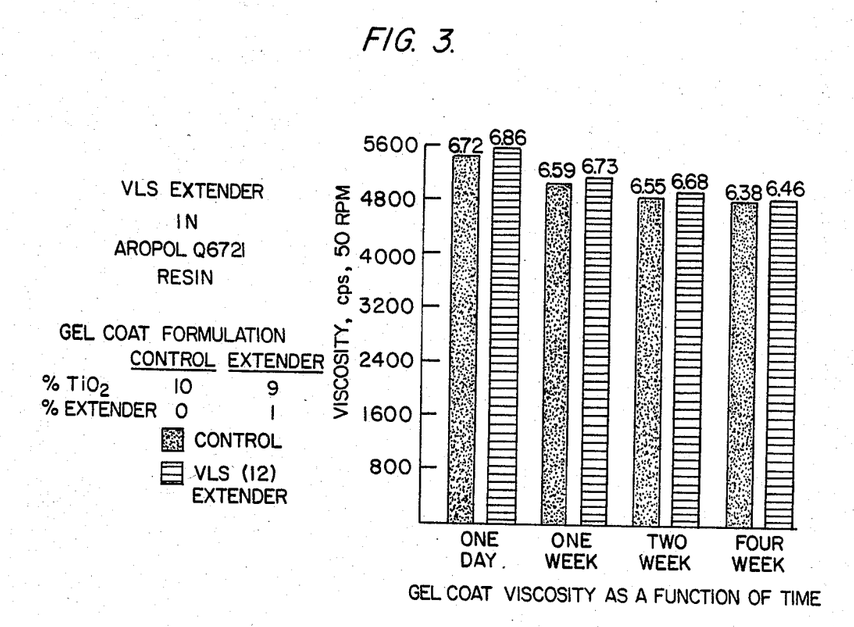
FIG. 3 is a bar graph illustrating the improvements of a preferred extender.
Figure 4:
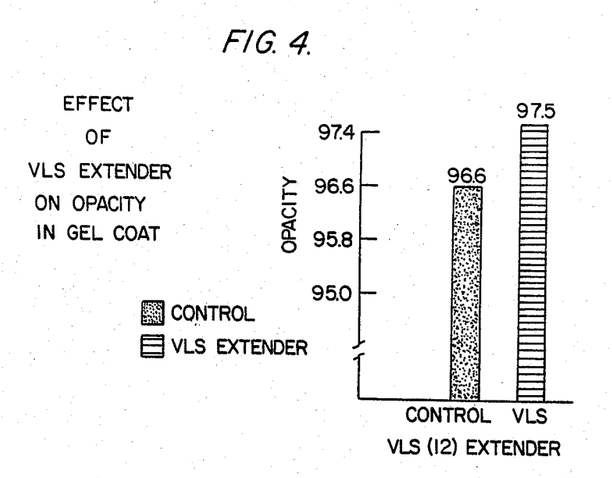
FIG. 4 is a bar graph illustrating the improvements of a preferred extender on gel coat opacity.

The results of these experiments are illustrated in FIGS. 3 and 4 accompanying the application. One week viscosity data of the control and extender-containing gel coats are shown in FIG. 1. The numbers on the top of each bar represent thixotropic index (T.I.) values. The extender numbers in parenthesis on the X-axis represent the specific grade of extender used in the study. The T.I. values are obtained by dividing the 5 RPM viscosity by the 50 RPM viscosity values.

The data in FIG. 1 shows that all extender-containing gel coats exhibit acceptable rheological properties versus the control. The handling and the spray characteristics of the extender-containing gel coats were found to be much better than the control gel coats.

The gel coats depicted in FIG. 1 were further evaluated as shown in FIG. 2 to study the effect of SSAS products on the opacity of gel coats.

For opacity evaluations, each gel coat was mixed with MEKP caalyst and its draw-down was made quickly on a Mylar film. The draw-downs were allowed to dry overnight in a dust free room. When the gel coat had cured, the opacity values were read in duplicate on an opacimeter. Opacity data is shown in FIG. 2. The numbers on the top of each bar represent the opacity values.

The opacity of SSAS containing gel coats is better than the control. The VLS (grade 2) type extender resulted in the best overall gel coat opacity and rheology characteristics.

The data obtained from FIGS. 1 and 2 showed that the VLS (grade 12) type extender resulted in the best overall gel opacity and rheology characteristics. Accordingly, additional, extensive evaluations of this extender were conducted in other resins. Thus, the VLS (grade 12) extender were evaluated in the Aropol Q6721 resin. This commercial resin is an unsaturated polyester resin sold by Ashland Chemical. The comparative viscosity stability data of the control and the VLS extender containing gel coats are shown in FIG. 3. The numbers on the top of each bar represent the T.I. values. This study shows that the VLS extender containing gel coats exhibit better rheology and thixotropic index values than the control.

The opacity values of the control and the VLS extender containing gel coats are depicted in FIG. 4 (the numbers on top of each bar represent the opacity values). As expected, the VLS type SSAS extender imparts better opacity to the gel coat and exhibits the best overall rheology characteristics.

EXAMPLE 2

PVC Evaluation

The extender properties of the SSAS products were studied in a polyvinylchloride (PVC) formulation which contained 10 phr (parts per hundred parts of resin) $TiO_2$. The control formulation and the 10% SSAS extended PVC formulations were prepared by mixing the solid ingredients (PVC resin, silica thixotrope and $TiO_2$) into two-thirds of the plasticizer (DOP) on a Cowles Dissolver for 10 minutes at 2300 RPM (using a two inch diameter Cowles blade). After the mixing was accomplished in the high viscosity state, the remaining one third of the plasticizer was then added and the mixing was continued for an additional five minutes in the low viscosity state. The formulated PVC samples were evaluated for viscosity and tensile properties in the PVC formulation shown in Table IV as follows:

TABLE IV

| PVC FORMULATION: | |
|---|---|
| Component | Amount-Parts |
| PVC Resin (GEON 121)* | 100 |
| DOP | 70 |
| Zeothix 265 ® | 3 |
| Thermcheck - Stabilizer | 3 |
| $TiO_2$ | 10 |
| Extender | 0 or 1 |

*B. F. Goodrich
**M & T Chemicals

Figure 5:
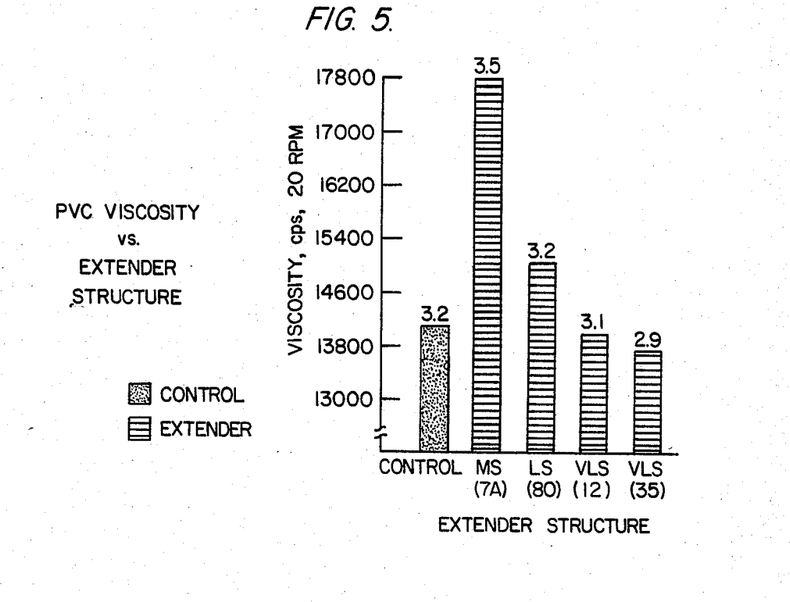
FIG. 5 is a bar graph illustrating evaluations of extenders in polyvinyl chloride compositions.

The extender properties of the SSAS products were evaluated in this PVC formulation. The SSAS extended samples were prepared by replacing 10% by weight of $TiO_2$ in the formulation with the SSAS product. The rheology data and evaluation results are given in FIG. 5. The numbers on the top of each bar are thixotropic index values. This study shows that all extender containing PVC compositions exhibit higher viscosity and thixotropic index values than the control. The viscosity increase is related to the SSAS structure—higher structure SSAS products imparted higher viscosity than the lower structure SSAS product.

Figure 6:
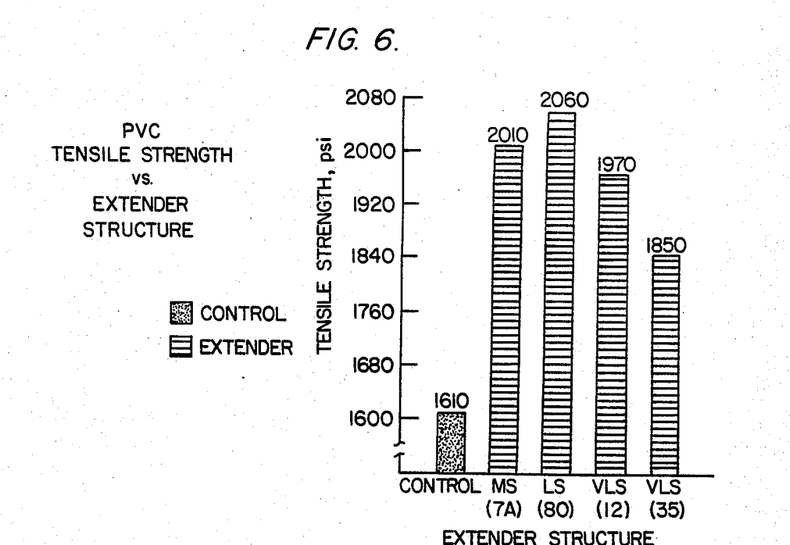
FIG. 6 is a bar graph illustrating improvements in tensile strength by the extenders in polyvinyl chloride compositions.

The PVC compositions were fused at 163° C. in the Dak Press and compression molded to prepare the ASTM test pieces. ASTM test method D-638 was used. The tensile properties of the control and the SSAS containing compounds are given in FIG. 6. Here again, the tensile properties are related to the SSAS structure. The higher structure SSAS extenders impart better reinforcing properties than the relatively lower structure products.

In another study the very low structure SSAS product was treated with varying levels of the commercial product CM, an ethoxylated alcohol alkyl ester and a proprietary product of Solem Industries, and then evaluated for reinforcing properties in a filled PVC formulation. The formulation was as follows:

TABLE V

| CM TREATMENT FORMULATION | |
|---|---|
| Component | Amount-Parts |
| PVC Resin (GEON 12) | 100 |
| DOP | 70 |
| Zeothix 265 ® | 2 |
| Atomite | 25 |
| VLS Extender* | 25 |

*Zeolex 35 ® treated with CM

Figure 7:
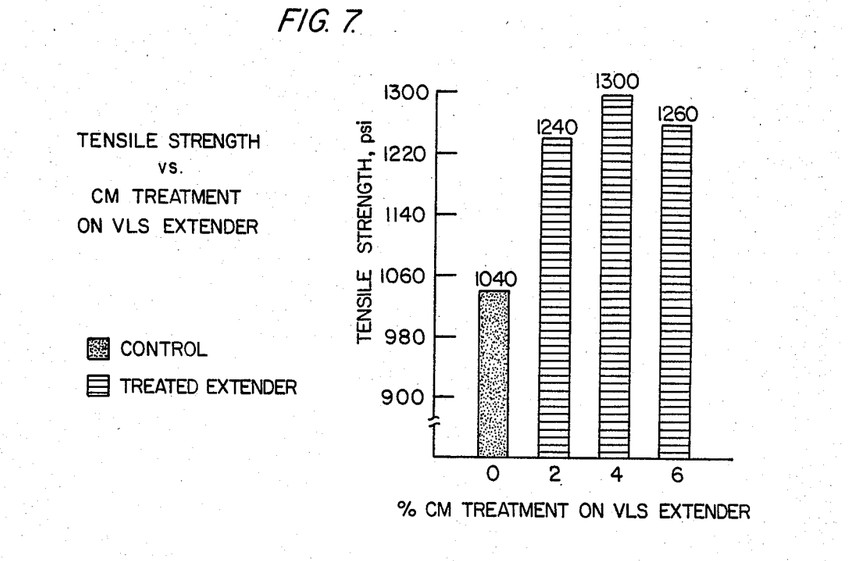
FIG. 7 is a bar graph illustrating improvements of treated extender on tensile strength of a further polyvinyl chloride compositions.

The effect of the CM treatment of the properties of VLS extender (grade 35) was evaluated in this highly filled PVC formulation. The formulation contained 25 phr VLS extender. The effect of CM treatment is shown in FIG. 7. The tensile strength of the VLS extender increases with the CM treatment and appears to go through a maximum @ 4% CM treatment.

EXAMPLE 3

Pigmented SMC Evaluation

A typical SMC (sheet molding compound) recipe was used to evaluate the properties of SSAS extenders (See Table VI).

TABLE VI

| SMC FORMULATION | | |
|---|---|---|
| A. NEUTRAL COMPOUND | | |
| 1. MR 13017 - Molding Resin | 65 | Parts |
| 2. MR 63004 - Polystyrene Solution | 35 | Parts |
| 3. Tertiary Butyl Perbenzoate | 1 | Part |
| 4. Camel White ($CaCO_3$) | 150 | Parts |
| 5. Zinc Stearate | 3.5 | Parts |
| B. WHITE PASTE | | |
| Neutral Compound (A above) | 100 | Parts |
| 75% $TiO_2$ Dispersion | 2 | Parts |
| C. TINT BASE | | |
| White Paste (B above) | 100 | Parts |
| 25% Phtaloblue Dispersion | 1 | Part |

The neutral paste (100 parts) was mixed with 2 parts titanium dioxide to produce a white paste. The white paste (100 parts) was then mixed with one part phthaloblue to produce a tint base. The extender properties of the SSAS products were studied by replacing a portion of the color in the tint base with the SSAS product. Molded samples were prepared by curing the control and the extended tint base side by side at a molding temperature of 150° C. The evaluations of the SSAS extenders in the pigmented SMC were undertaken in the formulation given in Table VI. The tinted color control and the extended SMC compounds were molded side by side. The molded samples were evaluated for color comparisons visually and by using the Hunter Color meter. Results of this study are given in Table VII.

TABLE VII

| Color Properties of SSAS Extenders | | | | |
|---|---|---|---|---|
| Extender | | | Hunter | Visual* |
| Structure | Grade | % Level | Δb Value | Color |
| LS | 40 | 0 | Std. | 5 |
| | | 5 | −0.2 | 6 |
| | | 10 | −0.7 | 7 |
| VLS | 35 | 0 | Std. | 5 |
| | | 5 | 0.0 | 5 |

TABLE VII-continued

| Color Properties of SSAS Extenders | | | | |
|---|---|---|---|---|
| Extender | | | Hunter | Visual* |
| Structure | Grade | % Level | Δb Value | Color |
| | | 10 | −1.7 | 8 |

*5 means Standard Color Value, numbers higher than 5 mean better color value, numbers less than 5 mean a color value lower than Standard.

The data in Table VII points to the conclusion that LS and VLS extenders impart better color values and can be used to extend pigment and colors to the extent of 10%.

EXAMPLE 4

Low Density Polyethylene (LDPE) Evaluation

LDPE was compounded with titanium dioxide on a heated two-roll mill. The extended formulations were prepared by replacing a portion of titanium dioxide with a suitable SSAS product.

The compounding of the LDPE resin with $TiO_2$ was carried out on a two-roll differential speed laboratory mill by first banding the polyethylene at 121° C. for ten minutes. Titanium dioxide (at 3 phr) was added to the polymer melt and mixed in for five minutes. During the five minutes mix the compound was cut repeatedly to ensure thorough mixing. The compounded LDPE was then removed from the mill and allowed to cool before cutting test specimens for physical testing.

Figure 8:
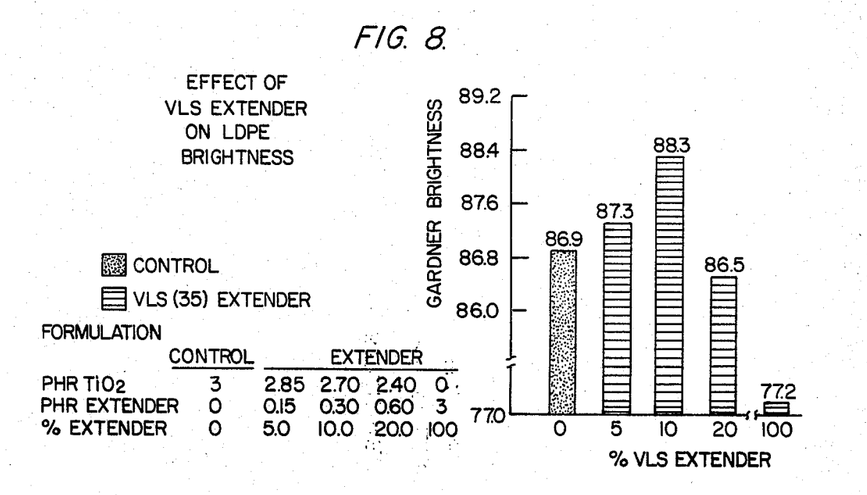
FIG. 8 is a bar graph illustrating the effect of the extenders on low density polyethylene compositions.

The brightness was measured on 30 mil thick samples. The brightness of the control and the extended samples was measured on the Gardener Brightness Meter, Model XL-10. The effect of SSAS products on brightness was studied in a typical LDPE formulation which contained three parts of $TiO_2$ pigment per 100 parts of the resin. The LDPE was compounded with extenders in which 5, 10 and 20% by weight of $TiO_2$ in the formulation were substituted with the SSAS products. In each case, LDPE was also compounded with 3 phr extender. The data in FIG. 8 depicts the effect of VLS (grade 35) extender on the brightness of LDPE. This study shows that, when $TiO_2$ in the formulations is replaced with up to 10% VLS extender, the extended formulations exhibit higher brightness than the control.

EXAMPLE 5

Epoxy Evaluation

The extender properties of SSAS products were studied in an epoxy solution which consisted of 75 parts of Shell's Epon 828 epoxy resin and 25 parts of the xylene diluent. A typical control epoxy formulation contained 10% $TiO_2$ pigment, 6% Zeothix 265 ® silica thixotrope, and 84% epoxy solution. The $TiO_2$ in the control formulation was extended with 5% and 10% SSAS product. The rheology data was evaluated, and opacity was determined on a 10 mil drawdown of the epoxy coating (on Mylar film) which had been hardened with the TETA (triethylene tetramine) hardener.

The effect of extender structure on the opacity and rheology of an epoxy coating was evaluated in a typical coating formulation and the results are reported in Table VIII. The optical properties of the epoxy coating were evaluated by adding 12.9 phr of the TETA hardener to 45 grams of the coating formulation. A drawdown of 10 mil film was made on clear Mylar film for all opacity measurements.

TABLE VIII

Effect of SSAS Extenders on Epoxy Coating* RHEOLOGY AND OPACITY DATA

| Extender Type | % $TiO_2$ | % SSAS | Brookfield Viscosity, 4 Weeks | | | Film Opacity |
|---|---|---|---|---|---|---|
| | | | 2 RPM | 20 RPM | T.I. | |
| Control | 10 | 0 | 26,400 | 3,790 | 7.0 | 92.1 |
| MS(7A) | 9 | 1 | 27,900 | 3,910 | 7.1 | 90.8 |
| LS(40) | 9 | 1 | 27,800 | 3,890 | 7.1 | 91.1 |
| VLS(35) | 9 | 1 | 26,400 | 3,660 | 7.2 | 90.9 |
| VLS(12) | 9 | 1 | 25,600 | 3,650 | 7.0 | 90.8 |

*Resin solution contained 75% Epon 828 and 25% xylene.

The data in Table VIII shows that all SSAS extenders used in this study resulted in either equal or better rheology characteristics than the control. The opacity data confirms that among all the extenders, the LS (grade 40) type extenders resulted in the best opacity values.

EXAMPLE 6

Ethylene Vinyl Acetate Resin

The reinforcing properties of the SSAS products were evaluated in a ethylene-vinyl acetate copolymer (EVA) resin of the following formulation given in Table IX.

TABLE IX

| SSAS PRODUCTS IN EVA | |
|---|---|
| FORMULATION | AMOUNT |
| Eva Resin (EY 901-25) | 100 Parts |
| SSAS Filler[a] | 40 Parts |
| Zinc Oxide | 2 Parts |
| Zinc Stearate | 1 Part |
| Stearic Acid | 1 Part |
| SR-350[b] | 1 Part |
| Vulcup 40 KE[c] | 3 Parts |

[a]SSAS fillers of different structure levels were used. Huber N 990 carbon black was used as a control.
[b]SR-350 is a co-agent, available from Sartomer Company.
[c]Vulcup 40 KE, Vulcanizer, Hercules, Inc.

The SSAS products were compounded by a process which consisted of using a Banbury Mixer for compounding and a two-roll mill for sheeting.

The Banbury Mixer was preheated to 107° C. and at zero minute, EVA was added with the ram at the low position. In the raised ram position, the SSAS filler, the co-agent, zinc oxide, zinc stearate and stearic acid were added to the Banbury Mixer in the next two minutes. The contents were dropped at the fourth minute at a temperature of 115° C.

The compound was then banded on the two-roll mill preheated to 70° C. The peroxide curing agent, Vulcup 40KE was then added and blended by cross cutting the compound several times for uniform mixing. The front roll of the two-roll mill was run at 34 RPM and the back roll at 45 PRM. After sheeting, the cured compound was then tested for physicals by the standard ASTM methods. A low structure thermal black, Huber N990, was used as a control.

The reinforcing properties of SSAS filler in EVA are shown in Table X as follows:

TABLE X

| Reinforcing Properties of SSAS Fillers in EVA | | | | |
|---|---|---|---|---|
| SSAS Product | | Tensile, | % | Tear-Die C, |
| Structure | Grade | psi | Elongation | ppi |
| N990 | Control | 1610 | 410 | 165 |
| MS | 7A | 2400 | 610 | 250 |

TABLE X-continued

| Reinforcing Properties of SSAS Fillers in EVA | | | | |
|---|---|---|---|---|
| SSAS Product | | Tensile, | % | Tear-Die C, |
| Structure | Grade | psi | Elongation | ppi |
| LS | 40 | 1900 | 550 | 190 |
| LS | 23 | 1870 | 540 | 195 |
| VLS | — | 1680 | 550 | 180 |

This study clearly showed that the reinforcing properties of the SSAS products are related to their structure—the higher structure products impart better reinforcing properties than the lower structure materials. The effect of SSAS structure on reinforcing properties in EVA compositions as shown in Table X demonstrate that SSAS products can be used as reinforcing filler in EVA compositions. The MS type SSAS filler resulted in significantly higher tensile properties than the control.

In conclusion, the SSAS products can be used as pigment/colorant extenders in plastics. These unique products can also be used as reinforcing filler in PVC, EVA and other polymers. The potential applications of the SSAS products are summarized in Table XI as follows:

TABLE XI

| Unique Properties of SSAS Products | | |
|---|---|---|
| Application | Function | Type Structure |
| Gel Coat | Pigment/Colorant Extender | VLS |
| LDPE | Pigment/Colorant Extender | VLS |
| SMC | Color Enhancer | LS |
| PVC | Reinforcement | VHS, MS |
| PVC | Pigment/Colorant Extender | VLS |
| EVA | Reinforcement | VHS, MS |
| Polymers | Reinforcement | VHS, MS |
| Plastic | Rheology Control | VHS, MS |
| Coating | TiO$_2$ Extender | LS, VLS |

From the foregoing description and specific examples, the art can easily ascertain the essential characteristics of this invention, and without departing from the spirit and scope thereof, can make various changes and modifications of the invention to adapt it to various usages and conditions. The foregoing preferred specific embodiments are, therefore, to be construed as merely illustrative and not limitative of the disclosure in any way whatsoever.

What is claimed is:

1. A composition comprising an unsaturated polyester gel coat or pigmented polyester sheet molding compound having dispersed therein a synthetic alkali metal aluminum silicate having an average particle size of about 3.0 to 8.0 microns, said silicate being present in said gel coat or polyester sheet molding compound in an amount effective to enhance the tensile, reinforcing, opacity, brightness, pigment extending properties of said polyester gel coat or said polyester sheet molding compound.

2. The composition of claim 1, wherein said silicate is synthetic sodium aluminum silicate which comprises about 0.5 up to about 40 wt % of the composition.

3. The composition of claim 2, wherein said plastic material is an unsaturated polyester gel coat, and said synthetic sodium aluminum silicate is present in an amount effective to enhance opacity.

4. The composition of claim 1, wherein said plastic material is a pigmented polyester sheet molding compound, and said synthetic sodium aluminum silicate is present in an amount effective to extend pigments.

5. A method for enhancing the tensile, reinforcing, opacity, brightness, and pigment extending properties of a plastic composition selected from the group consisting of an unsaturated polyester gel coat and a pigmented polyester sheet molding compound, comprising dispersing in said plastic composition a synthetic sodium aluminum silicate having an average particle size of about 3.0 to 8.0 microns, said silicate being present in an amount effective to enhance said properties.

6. The method of claim 5, wherein said synthetic sodium aluminum silicate comprises about 0.5 up to 40 wt % of the composition.

7. The method of claim 6, wherein said plastic material is an unsaturated polyester gel coat, and said synthetic sodium aluminum silicate is present in an amount effective to enhance opacity.

8. The method of claim 6, wherein said plastic material is a pigmented polyester sheet molding compound; and said synthetic aluminum silicate is present in an amount effective to extend pigments.

* * * * *